(12) United States Patent
Fees et al.

(10) Patent No.: US 10,160,492 B2
(45) Date of Patent: Dec. 25, 2018

(54) BATTERY JUNCTION BOX HOUSING CONFIGURED TO DIRECT CRASH FORCES IN AN ELECTRIC VEHICLE

(71) Applicant: Inevit, Inc., Redwood City, CA (US)

(72) Inventors: Heiner Fees, Bietigheim-Bissingen (DE); Alexander Eichhorn, Eppingen (DE); Ralf Maisch, Abstatt (DE); Andreas Track, Sachsenheim (DE); Jörg Damaske, Freiberg (DE); Martin Eberhard, Woodside, CA (US); Michael John Miskovsky, San Anselmo, CA (US)

(73) Assignee: InEVit LLC, Santa Clara, CA (US)

( * ) Notice: Subject to any disclaimer, the term of this patent is extended or adjusted under 35 U.S.C. 154(b) by 0 days.

(21) Appl. No.: 15/677,373

(22) Filed: Aug. 15, 2017

(65) Prior Publication Data
US 2018/0105209 A1    Apr. 19, 2018

Related U.S. Application Data

(60) Provisional application No. 62/408,445, filed on Oct. 14, 2016, provisional application No. 62/414,208, (Continued)

(51) Int. Cl.
*B60K 1/04* (2006.01)
*B62D 21/15* (2006.01)
(Continued)

(52) U.S. Cl.
CPC ............. *B62D 21/15* (2013.01); *B60K 1/04* (2013.01); *B60L 11/1877* (2013.01); (Continued)

(58) Field of Classification Search
CPC .................................................. B60R 16/04
See application file for complete search history.

(56) References Cited

U.S. PATENT DOCUMENTS

| | | | |
|---|---|---|---|
| 6,188,574 B1 * | 2/2001 | Anazawa | B60K 1/04 180/68.5 |
| 8,237,403 B2 * | 8/2012 | Ishii | B60L 11/1803 320/112 |

(Continued)

FOREIGN PATENT DOCUMENTS

| | | |
|---|---|---|
| DE | 102013016824 A1 | 4/2015 |
| EP | 2749444 A1 | 7/2014 |
| EP | 3012175 A1 | 4/2016 |

OTHER PUBLICATIONS

International Search Report and Written Opinion dated Mar. 21, 2018 in International Application No. PCT/US2017/056625.

*Primary Examiner* — James A Shriver, II
*Assistant Examiner* — Vaughn Coolman
(74) *Attorney, Agent, or Firm* — Muncy, Geissler, Olds & Lowe, P.C.; Daniel Podhajny

(57) ABSTRACT

In an embodiment, a battery housing arrangement integrated into a vehicle floor of an electric vehicle includes a BJB housing including a BJB configured to be electrically coupled to each of a plurality of battery modules in a battery housing upon installation of the plurality of battery modules into the battery housing. The BJB housing is positioned between at least one center structural support bar and one or more vehicle chassis bars, and is configured to protect the plurality of battery modules in the battery housing from crash forces by directing crash forces from the one or more vehicle chassis bars to the at least one center structural support bar.

14 Claims, 13 Drawing Sheets

Related U.S. Application Data filed on Oct. 28, 2016, provisional application No. 62/422,090, filed on Nov. 15, 2016.

(51) Int. Cl.
  *B60L 11/18* (2006.01)
  *B62D 25/20* (2006.01)
  *B60R 16/04* (2006.01)
  *H01M 2/10* (2006.01)

(52) U.S. Cl.
  CPC .......... *B60L 11/1879* (2013.01); *B62D 25/20* (2013.01); *B60K 2001/0438* (2013.01); *B60K 2001/0461* (2013.01); *B60R 16/04* (2013.01); *B60Y 2306/01* (2013.01); *B60Y 2410/115* (2013.01); *H01M 2/1077* (2013.01); *H01M 2/1083* (2013.01)

(56) References Cited

U.S. PATENT DOCUMENTS

| | | | | |
|---|---|---|---|---|
| 8,459,399 | B2* | 6/2013 | Ohashi | B60K 1/04 180/312 |
| 8,950,537 | B2* | 2/2015 | Yokoyama | B60R 16/0239 180/68.5 |
| 9,321,416 | B2* | 4/2016 | Kinoshita | B60R 16/04 |
| 9,579,963 | B2* | 2/2017 | Landgraf | B60K 1/04 |
| 9,627,721 | B2* | 4/2017 | Kosaki | H02J 7/0068 |
| 9,758,215 | B2* | 9/2017 | Nagaya | B62M 7/12 |
| 9,821,645 | B2* | 11/2017 | Hayashi | B60K 1/00 |
| 9,873,456 | B2* | 1/2018 | Hara | B62D 21/155 |
| 2005/0274556 | A1* | 12/2005 | Chaney | B60K 1/04 180/68.5 |
| 2007/0216371 | A1* | 9/2007 | Yoon | B60L 11/18 320/150 |
| 2010/0025132 | A1* | 2/2010 | Hill | B60K 1/04 180/65.29 |
| 2010/0089675 | A1* | 4/2010 | Nagata | B60K 1/04 180/68.5 |
| 2010/0114762 | A1* | 5/2010 | Ishii | B60L 11/1803 705/40 |
| 2010/0231035 | A1* | 9/2010 | Tsuchiya | B60H 1/00278 307/9.1 |
| 2011/0094794 | A1* | 4/2011 | Asao | B60R 16/0238 174/549 |
| 2012/0028135 | A1* | 2/2012 | Ohashi | B62D 25/20 429/400 |
| 2012/0055724 | A1* | 3/2012 | Iwasa | B60K 1/04 180/68.5 |
| 2012/0055725 | A1* | 3/2012 | Mizoguchi | B60K 1/04 180/68.5 |
| 2012/0186888 | A1* | 7/2012 | Ross | B60K 1/02 180/65.31 |
| 2012/0244398 | A1* | 9/2012 | Youngs | B60K 6/28 429/61 |
| 2013/0045398 | A1* | 2/2013 | Katano | B60K 1/04 429/7 |
| 2013/0088044 | A1 | 4/2013 | Charbonneau et al. | |
| 2013/0202936 | A1* | 8/2013 | Kosaki | H01G 9/155 429/99 |
| 2013/0241493 | A1* | 9/2013 | Kosaki | B60K 1/04 320/128 |
| 2013/0248264 | A1* | 9/2013 | Matsuda | B60K 1/04 180/65.22 |
| 2013/0248268 | A1* | 9/2013 | Matsuda | B60K 1/04 180/68.5 |
| 2013/0273755 | A1* | 10/2013 | Yokoyama | B60R 16/0239 439/76.2 |
| 2015/0136504 | A1* | 5/2015 | Tsujimura | H01M 2/1077 180/68.5 |
| 2015/0195960 | A1* | 7/2015 | Seki | B60L 1/003 361/690 |
| 2016/0339774 | A1* | 11/2016 | Hayashi | B60K 1/00 |
| 2016/0347160 | A1* | 12/2016 | Landgraf | B60K 1/04 |
| 2017/0334309 | A1* | 11/2017 | Kouno | B60L 11/1874 |

\* cited by examiner

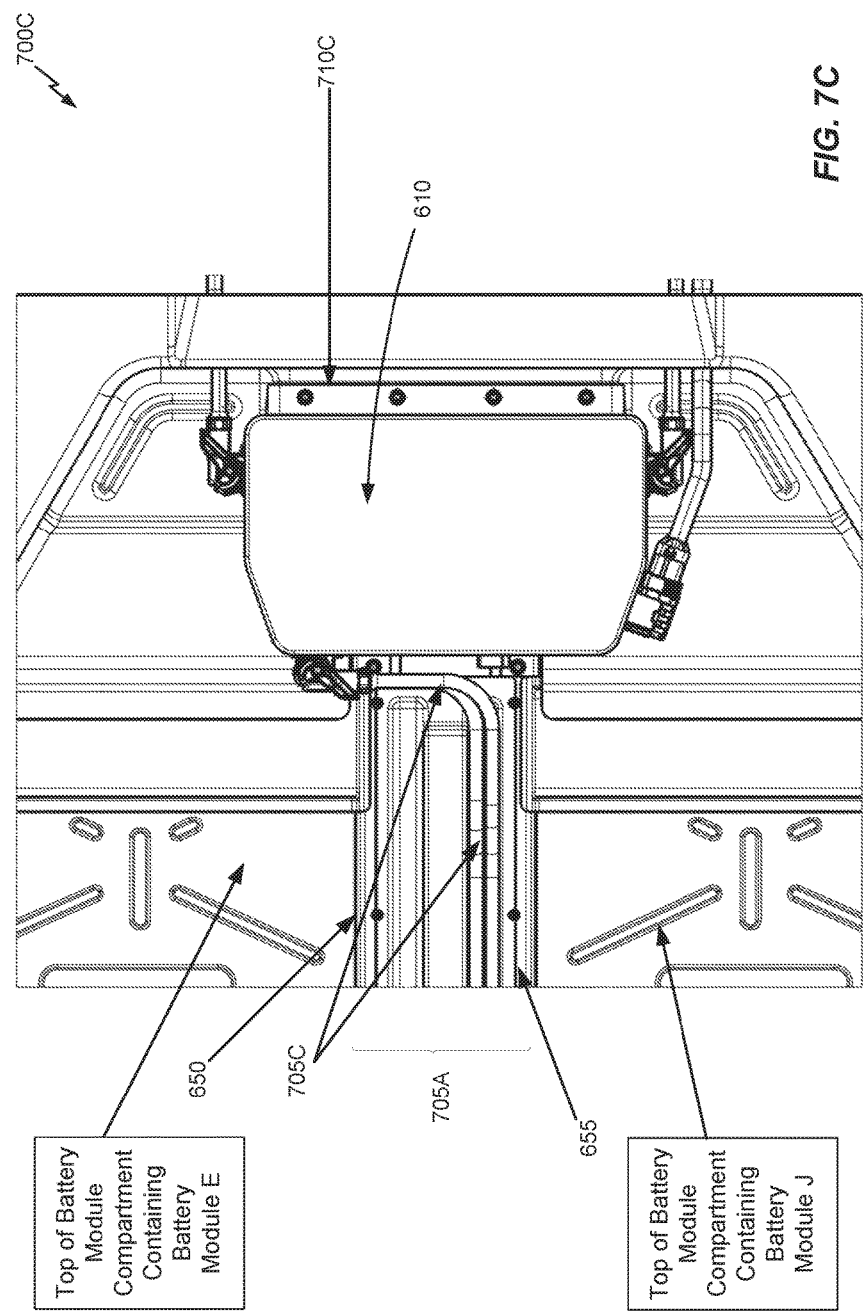

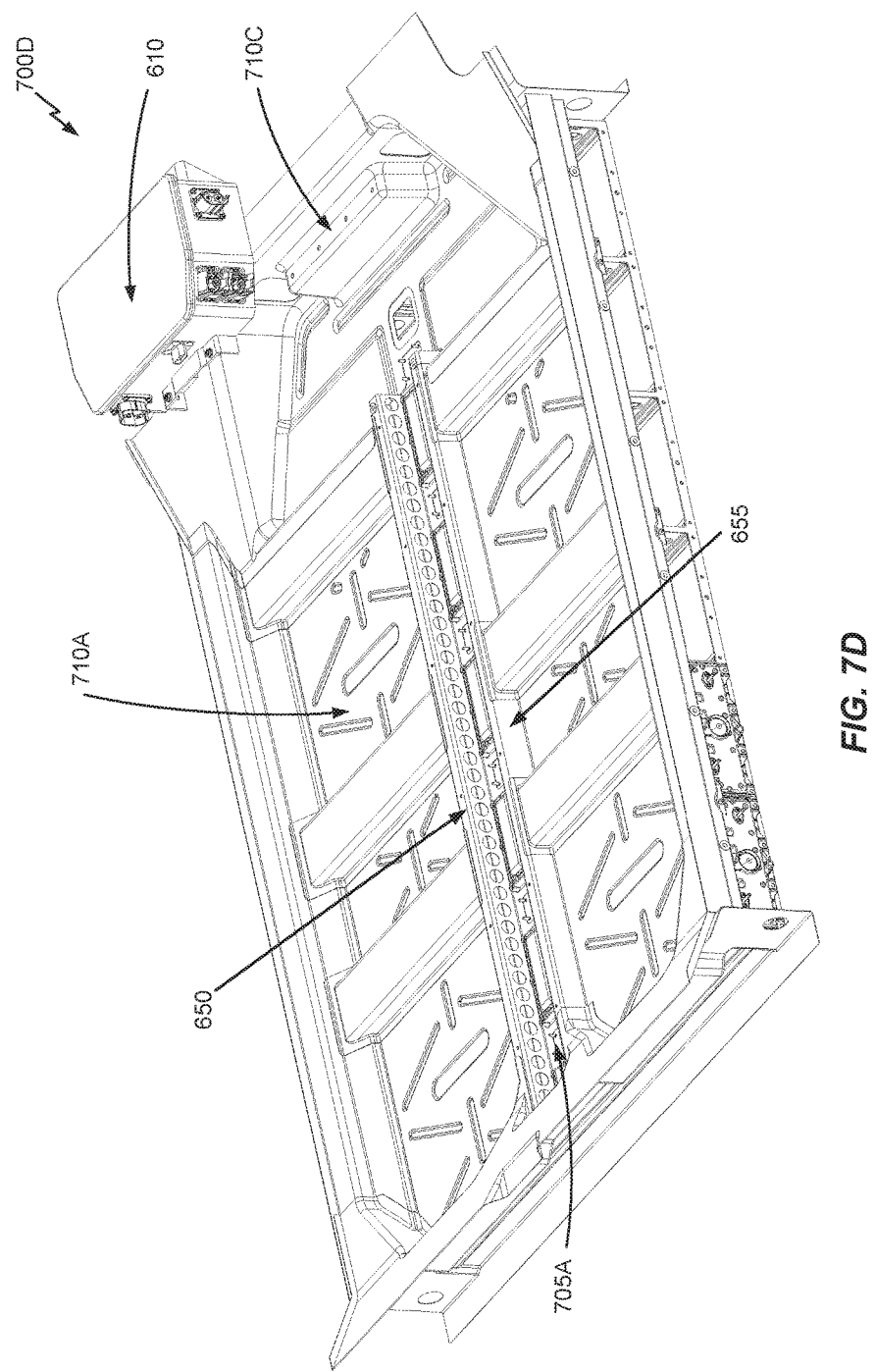

BATTERY JUNCTION BOX HOUSING CONFIGURED TO DIRECT CRASH FORCES IN AN ELECTRIC VEHICLE

CROSS-REFERENCE TO RELATED APPLICATIONS

The present application for patent claims the benefit of U.S. Provisional Application No. 62/408,445, entitled "CAR FLOOR SYSTEM WITH INTEGRATED BATTERY MODULES", filed Oct. 14, 2016, and also to U.S. Provisional Application No. 62/414,208, entitled "CAR FLOOR SYSTEM WITH INTEGRATED BATTERY MODULES", filed Oct. 28, 2016, and also to U.S. Provisional Application No. 62/422,090, entitled "CAR FLOOR SYSTEM WITH INTEGRATED BATTERY MODULES", filed Nov. 15, 2016, each of which is by the same inventors as the subject application, assigned to the assignee hereof and hereby expressly incorporated by reference herein in its entirety.

BACKGROUND

1. Field of the Disclosure

Embodiments relate to crash force management in an electric vehicle, and more particularly, to a battery junction box (BJB) housing configured to direct crash forces in an electric vehicle.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to a battery housing arrangement integrated into a vehicle floor of an electric vehicle, including a battery housing configured to house a plurality of battery modules, at least one center structural support bar that extends longitudinally across the battery housing, a battery junction box (BJB) housing including a BJB configured to be electrically coupled to each of the plurality of battery modules upon installation of the plurality of battery modules into the battery housing, wherein the BJB housing is positioned between the at least one center structural support bar and one or more vehicle chassis bars, and wherein the BJB housing is configured to protect the plurality of battery modules in the battery housing from crash forces by directing crash forces from the one or more vehicle chassis bars to the at least one center structural support bar.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIGS. 7A-7E illustrate various perspectives of an electric vehicle in accordance with embodiments of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

FIGS. 1-5 illustrate one exemplary configuration whereby a BJB is mounted on top of an associated battery housing to which the BJB is connected in accordance with embodiments of the disclosure.

Figure 1:
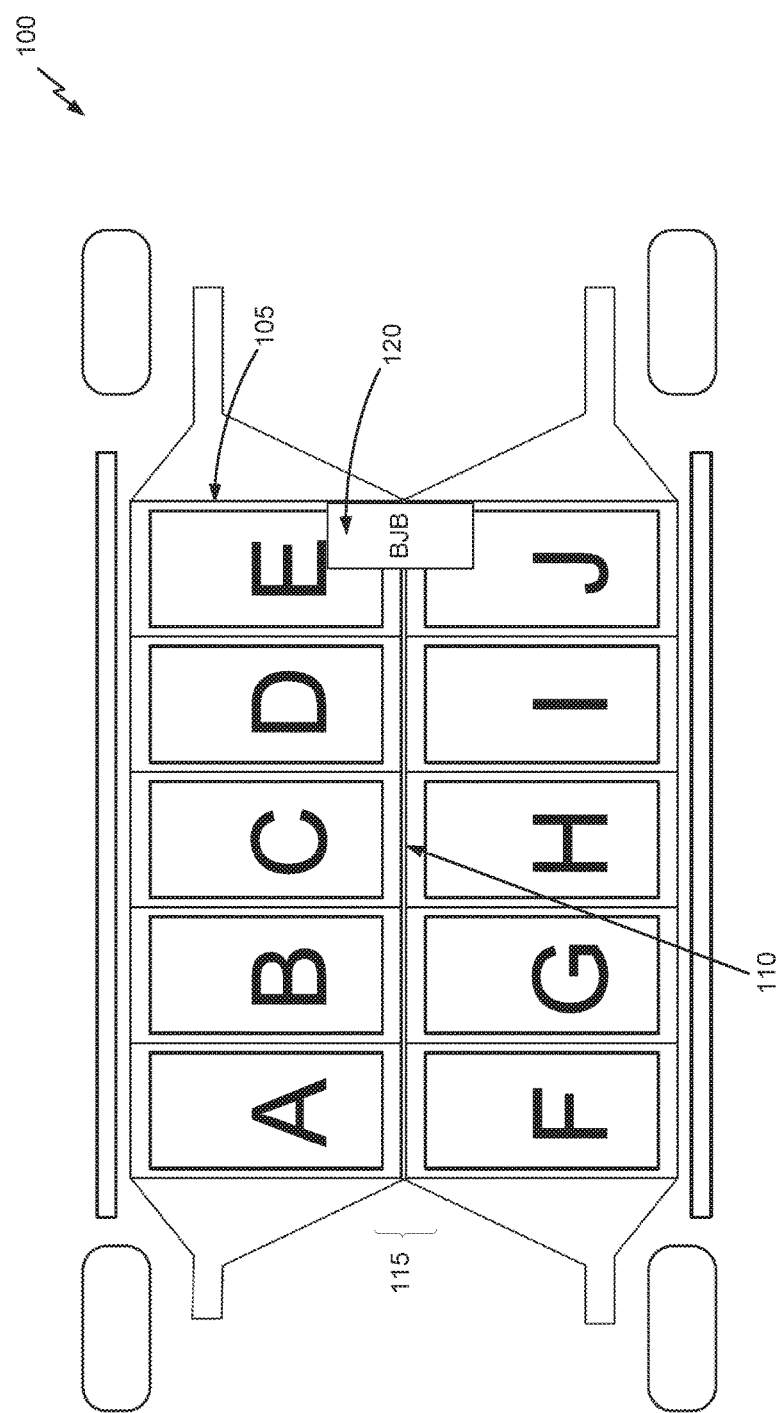
FIG. 1 illustrates a top-perspective of a cross-section of an electric vehicle including a battery housing in accordance with an embodiment of the disclosure.

FIG. 1 illustrates a top-perspective of a cross-section of an electric vehicle 100 including a battery housing 105 in accordance with an embodiment of the disclosure. FIG. 1 depicts various well-known components (e.g., wheels, axles, etc.) of the electric vehicle 100 to provide general context, but these components are not described in detail below for the sake of brevity. With respect to FIG. 1 and other FIGS described below, reference to battery "housing" and battery "module mounting area" is somewhat interchangeable. The battery module mounting area in FIG. 1 (and other FIGS described below) refers to an arrangement of battery module compartments configured to receive insertion of battery modules and to be sealed via insertion-side covers to form a battery housing. Further, in at least one embodiment, the battery module mounting area is part of a floor of the electric vehicle 100.

Referring to FIG. 1, the battery housing 105 includes ten battery module compartments denoted as A . . . J, and a middle bar 110 that is positioned between battery module compartments A . . . E and battery module compartments F . . . J on different longitudinal sides of the electric vehicle 100. Each battery module compartment includes a frame (or plurality of walls) defining an interior space configured to fit a respective battery module, and an insertion-side which may be opened to facilitate insertion and/or removal of the respective battery module. The middle bar 110 may be constructed from the dividers (or firewalls) that separate laterally adjacent (e.g., aligned width-wise as a left/right pairing in the electric vehicle 100) battery module compartments A . . . J (e.g., the firewall between battery module compartments A and F, the firewall between battery module compartments B and G, etc.).

In an example, the middle bar 110 may be one single longitudinal "bar" that extends across the entirety of the battery housing 105. In this case, the interior sidewalls of each battery module compartment may be attached to the middle bar 110 to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area. In this case, the middle bar 110 is an aggregation of the individual firewalls contained in each respective battery module compartment chamber across the battery housing 105.

While the middle bar 110 is illustrated in FIG. 1 as being centered in the battery housing 105, the middle bar 110 can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 105), with the two separate middle bars either corresponding to two long "bars" extending across the battery housing 105 or two aggregations of chamber-specific firewalls from longitudinally stacked battery module compartment chambers. In at least one embodiment, the gap between the two separate middle bars may be used as a tunnel space (e.g., to facilitate optical communication, to run LV/HV busbars, etc.), although the embodiments describe below relate to an implementation where the tunnel space is defined above the battery module compartments, and not in a gap between laterally adjacent battery module compartments.

It will be appreciated that the battery housing 105 including ten battery module compartments A . . . J is shown in FIG. 1 for example purposes only. For example, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.). The battery module compartments A . . . E are arranged longitudinally (i.e., lengthwise with respect to electric vehicle 100) on a right-side of the electric vehicle 100, while battery module compartments F . . . J are arranged longitudinally on a left-side of the electric vehicle 100.

As used herein, a "battery module" is a package that contains a plurality of battery cells, such as lithium ion battery cells. Battery modules may be configured with a prismatic or pouch battery cell arrangement (sometimes referred to as a soft pack), while other battery modules are configured with a cylindrical battery cell arrangement. Generally, prismatic or pouch battery modules are more efficient in terms of battery cell stacking, while cylindrical cells in cylindrical battery modules do not stack as well (e.g., more empty space inside battery module) but have a higher energy density (and any empty space can be repurposed, for cooling and fire prevention because air is a good heat insulator).

As used herein, a battery module compartment being "sealed" refers to a seal that is at least water-tight or liquid-tight, and optionally gas-tight (at least, with respect to certain gases such as smoke from fire, carbon, electrolyte particles, etc.). Generally, the sealing of the battery module compartments is a result of its interior walls being welded or glued together (where possible), and any connection interfaces (e.g., insertion-side cover, coolant interface plugs, electrical interface connectors, etc.) being sealed with a suitable type of sealant (e.g., O-ring, rubber gasket, sealing compound, etc.). While the sealing of the battery module compartments could potentially be hermetic (e.g., gas-tight with respect to all gases), hermetic sealing is not necessary (e.g., due to high cost). Accordingly, the sealing of the battery module compartments may be configured to block propagation of likely contaminants (e.g., liquids such as water, flames and/or smoke from fires, carbon, electrolyte particles, etc.) between battery module compartments. Moreover, while various embodiments described below relate to lateral or side-insertion of battery modules into respective battery module compartments, the insertion-side for the battery module compartments A . . . J may vary between different battery module mounting area configurations.

Referring to FIG. 1, in at least one embodiment, each respective cover may be implemented as an endplate that is physically integrated with a corresponding battery module. In this case, when the cover (or endplate) is secured into a battery module compartment, the position and orientation of the battery module inside of the battery module compartment can be controlled (or fixed) based on the battery module being sandwiched between the cover (or endplate) on one side of the battery module compartment and at least one interior wall (or firewall) (e.g., multiple firewalls may be used to help to define a tunnel space between battery module compartments A . . . E and battery module compartments F . . . J as described below in more detail) on an opposing side of the battery module compartment (e.g., between battery module compartments A and F, B and G, C and H, D and I, or E and J). In this manner, the endplate and battery module compartment may be closed and sealed to form a closed compartment profile that functions as a stiff structural element that helps to stiffen (or structurally reinforce) the electric vehicle 100. In particular, the firewalls between laterally adjacent battery module compartments form a strong middle bar 110 as noted above, while laterally aligned interior walls of the battery module compartments form a series of structural support bars arranged perpendicularly to the middle bar 110 along the Y axis. The middle bar 110 and laterally aligned interior bars may function together to increase the stiffness of the battery housing 105 as well as to increase resistance to deformation in the shape of the battery housing 105 (e.g., increased resistance to a torsion-effect that changes a parallelogram shape of the battery housing 105).

The insertion-side for the battery module compartments A . . . J may vary between different battery module mounting area configurations. For example, the plurality of covers that cover the insertion sides of battery module compartments A . . . J may comprise top-covers for a top-inserted battery module mounting area configuration, or side-covers for a lateral-inserted battery module mounting area configuration or a hinged-inserted battery module mounting area configuration. Also, in certain embodiments, a 1:1 ratio between the plurality of covers and the battery module compartments A . . . J is maintained, such that each cover is configured to individually cover (and seal) a single battery module compartment (e.g., N covers for N battery module compartments). In an alternative embodiment, one or more covers may be configured to cover (and seal) a group of battery module compartments. In the case of a group-cover, the battery module compartments that are part of the group are sealed from any adjacent battery module compartment outside of the group. In one example, each of the plurality of covers may be configured to seal two battery module compartments (e.g., N/2 covers for N battery module compartments). As used herein, reference to a "subset" of battery module compartments refers to either an individual battery module compartment that is individually sealed by a single corresponding cover or a group of two or more (and less than all) battery module compartments that are collectively sealed by a single corresponding cover.

Referring to FIG. 1, the middle bar 110 is configured to increase the overall stiffness of the battery housing 105 (and thereby, the electric vehicle 100). In an example, the middle bar 110 may be positioned underneath a tunnel space 115 that, similar to the middle bar 110, may be centered between battery module compartments A . . . E and battery module compartments F . . . J. The tunnel space 115 is an enclosed space that is defined in part by a set of structural support bars that run longitudinally across the top of the battery housing 105. For example, the set of structural support bars function as sidewalls of the tunnel space which are covered via a sheet metal top. For example, covering the tunnel space with a sheet metal top may add some degree of structural support (or stiffness) to the battery housing 105, and may also provide some degree of electromagnetic shielding (e.g., caused by signals and/or power emitted into the tunnel space from LV and/or HV interfaces to battery modules installed underneath the tunnel space). As noted above, the battery module compartment firewalls that comprise the middle bar 110 limit propagation of hazards (e.g., excessive heat or fire, fluid leaks, etc.) between battery module compartments A . . . E and battery module compartments F . . . J. The tunnel space 115 optionally permits wireless communication (e.g., optical communication) between the battery modules inserted into the battery compartments A . . . J and a wireless communications interface (not shown) that may be deployed at some point along the tunnel space 115. In an example, the tunnel space 115 may be outside of the battery module compartments A . . . J and effectively on 'top' of the battery housing 105 in the middle of the electric vehicle 100 (e.g., along the top of middle bar 110). Alternatively, as noted above, instead of being defined over, or on 'top', of the battery housing 105, the tunnel space 115 may instead be vertically aligned (or level) with the battery modules A . . . J in the battery housing 105 in-between adjacent battery module compartments on different lateral sides of the electric vehicle 100 (e.g., two interior walls or firewalls are used to seal each pair of laterally adjacent battery module compartments, with spaces in-between each pair of laterally adjacent battery module compartments defining the tunnel space 115).

While not shown expressly in the top-perspective depicted in FIG. 1, one or more busbars (e.g., high-voltage (HV), low-voltage (LV) busbars, etc.) may be deployed along the tunnel space 115 to provide electrical and/or communications connections between battery modules inserted into any of the battery module compartments A . . . J and a BJB 120. The BJB 120 is an electrical component that contains various fuses, connectors, printed circuit boards (PCBs) and so on, which are contained in a BJB housing. The BJB 120 in FIG. 1-2 thereby represents both the electrical components of the BJB itself, as well as the associated BJB housing. The BJB 120 in FIG. 1 is shown as mounted on top of the battery housing 105 (more specifically, on top of the middle bar 110 which may comprise firewalls between respective battery module compartments) in proximity to battery modules E and J and aligned with the tunnel space 115 (e.g., the bars or sidewalls that define the tunnel space may connect directly to the BJB 120). While not shown expressly in FIG. 1, the BJB housing of the BJB 120 may protrude out of the floor of the electric vehicle 100 and into a passenger cabin. For example, the BJB housing of the BJB 120 may be contained at least in part within a rear passenger seat inside the passenger cabin of the electric vehicle 100.

Referring to FIG. 1, in an example, each battery module compartment may include HV connectors for connecting battery modules in adjacent battery module compartments in series. For example, the BJB 120 may connect to an HV input connector of battery module compartment J, which is plugged into a battery module and connects to an HV output connector on battery module compartment J. The HV output connector connects to an HV busbar which is connected to an HV input connector on battery module compartment I, and so on. In this manner, the battery module in battery module compartment J may be daisy-chained in series to the battery module in battery module compartment I, which is in turn daisy-chained (in order) to battery modules in battery module compartments H, G, F, A, B, C, D and E, with the HV output connector in battery module compartment E being connected back to the BJB 120 to complete the HV power connection between the BJB 120 and the respective battery modules of the battery housing 105. In an example, HV connectors may be paired together as a paired HV connector component, with an HV input connector and an HV output connector arranged on different sides of the paired HV connector component (e.g., such that the respective HV connectors are configured to connect to battery modules on different sides of the battery housing 105). For example, a battery module in battery module compartment J may connect to an HV input connector portion of the paired HV connector component, with a battery module in battery module compartment E connecting to an HV output connector portion of the paired HV connector component.

Referring to FIG. 1, each battery module compartment may also include an LV module-to-tunnel interface which facilitates a connection between the battery module and the BJB 120 without daisy-chaining to the other battery module compartments as noted above for the HV power connection. The LV module-to-tunnel interface in the battery module compartment may function as an interface between various LV components inside the battery module, such as sensors (e.g., temperature sensors, smoke sensors, etc.), and the BJB 120 via the tunnel space 115. For example, the LV module-to-tunnel interface may include a light guide for transporting optical signals (e.g., IR signals) through the tunnel space 115 to facilitate a data connection between the battery module and a battery module controller (BMC) at the BJB 120. Alternatively, the LV module-to-tunnel interface in the battery module compartment may simply be wired to the BMC at the BJB 120 via one or more wires that are run through the tunnel space 115.

In an example, centering the busbars along the tunnel space 115 in the middle of the electric vehicle 100 helps to isolate the busbars from crash impact zones (e.g., the left and right sides of the electric vehicle 100), which in turn protects the busbars from crash impact-related damage. Also, defining the tunnel space 115 on top of the middle bar 110, which may be configured as a strong metal 'spine' of the battery housing 105, may likewise help to protect the busbars with the tunnel space 115 functioning as a relatively protected area (e.g., from crash impact-related damage, etc.). The tunnel space 115 may also function as an electromagnetic shield that protects the busbars from external electromagnetic interference. In an example, the busbars may be attached to a top-portion of the battery module compartments in proximity to the firewall(s), so that the tunnel space 115 remains substantially empty, which may facilitate unobstructed (line-of-sight of point-to-point) communication for optical communications. The central busbars may include LV busbars and HV busbars, as noted above, although the LV busbars may be omitted if an optical LV communications interface is implemented (e.g., because LV wiring is not required to communicate with the individual battery modules).

With respect to the embodiment whereby the tunnel space 115 is defined on 'top' of the battery housing 105, in an example, each pair of laterally adjacent battery module compartments may include a set of holes located proximately to the tunnel space 115 and aligned perpendicular to a direction in which the battery module is inserted or removed (e.g., for lateral or side-insertion, the holes may be on an upper wall or top wall of the battery module compartment). An LV module-to-tunnel interface is mounted into one of the holes to establish a data connection between respective battery module(s) and the BJB 120, and positive and negative HV connectors are mounted into the set of holes for connecting battery modules to HV busbars in the tunnel space 115. For example, HV connectors and an LV module-to-tunnel interface may be inserted into the set of holes, and then secured and sealed. Then, when a battery module is inserted into the battery module compartment, an electrical interface of the battery module is aligned with the HV connectors and the LV module-to-tunnel interface such that the battery module is plugged into the HV connectors and the LV module-to-tunnel interface of the battery module compartment upon full insertion into the battery module compartment, and the battery module is disconnected from the HV connectors and the LV module-to-tunnel interface of the battery module compartment when removed from the battery module compartment. In an example, the HV connector and the LV module-to-tunnel interface may interface with battery modules on both sides of the battery module mounting area. As noted above, the HV connectors may each be configured within a paired HV connector component, whereby each paired HV connector component includes a first HV connector configured for coupling to a battery module in a first battery module compartment on one lateral side (e.g., left side or right side) of the battery module mounting area, and also a second HV configured for coupling to a second battery module on the other lateral side (e.g., left side or right side) of the battery module mounting area.

Moreover, battery modules in battery module compartments that are adjacent to each other longitudinally (as opposed to laterally adjacent battery modules) may be electrically coupled to each other via the HV busbars in series, as noted above. In FIG. 1, this means that 'neighbor' battery modules in battery compartments A and B are electrically coupled, that 'neighbor' battery modules in battery compartments B and C are electrically coupled, and so on. This electric coupling can be chained from battery module compartment to battery module compartment with HV being available at the BJB once a last battery module is inserted (e.g., each of battery module compartments A . . . J).

The HV connectors and the LV module-to-tunnel interface may be sealed (e.g., via a plastic cover, a rubber gasket, a sealing adhesive, a sealing ring such as an O-Ring in an axial or a radial direction, etc.) so that each battery module compartment is sealed. In an example, LV and HV busbars may be secured to the respective LV module-to-tunnel interface and HV connectors via screwing. Alternatively, instead of an LV busbar, an optical LV communications interface may be used as the LV module-to-tunnel interface for transporting optical signals (e.g., IR signals) through the tunnel space 115.

In an example, positioning the HV busbars in the tunnel space 115 may permit workers (e.g., assembly workers at a vehicle assembly plant during assembly of the electric vehicle 100, maintenance workers, etc.) access to a particular subset of battery module compartments without being exposed to voltage from battery modules outside of the particular subset of battery module compartments. For example, as noted above, the HV connectors of the respective battery module compartments may be positioned in an interior or centered portion of the electric vehicle 100, while the workers may be located outside the electric vehicle 100 for a lateral module insertion scenario, thereby shielded from the central HV busbars.

In particular, during insertion of a battery module that includes an integrated cover (or endplate), the worker may insert the battery module into a battery module compartment and couple the battery module to at least one corresponding HV busbar (e.g., via connectors to HV busbars, such as plugs, where the battery module coupling may occur by virtue of the worker pushing or sliding an electrical interface of the battery module into the corresponding connector), and then secure (e.g., by tightening bolts, etc.) the cover (or endplate) to the battery module compartment so that the battery module compartment is sealed. Likewise, during removal, the worker may free or unlock the cover attachment mechanism (e.g., by removing bolts, etc.), and may then slide the battery module out of the battery module compartment. Hence, in at least one embodiment, during either insertion or removal, the worker only accesses the battery module(s) inside one particular subset of battery module compartments and its associated busbar(s) at a time without exposing the workers to the HV busbars.

In the embodiment of FIG. 1, the BJB 120 is positioned in a middle or center (longitudinally) of the electric vehicle 100 on top of the battery housing 105. For example, to simplify and/or shorten HV routing and improve safety, the BJB 120 may be positioned at one end of the battery housing 105 above the battery module compartments E and J, or alternatively at the other end of the battery housing 105 above the battery module compartments A and F). In an example, positioning the BJB 120 in the middle of the electric vehicle 100 above the tunnel space 115 may reduce an electrical connection length between the BJB 120 and electrical connections to the battery modules due to the busbars being run along the tunnel space 115.

The battery housing 105 described above with respect to FIG. 1 may be based on various battery module mounting area configurations, such as a lateral-inserted battery module mounting area configuration (e.g., battery modules are inserted into a battery module mounting area from the left and right sides of an electric vehicle) which is used to describe various embodiments below. However, while not expressly illustrated, other battery module mounting area configurations are possible, such as vertically-inserted battery module mounting area configurations (e.g., battery modules are inserted into a battery module mounting area from the top or bottom sides of an electric vehicle), hinged-inserted battery module mounting area configurations (e.g., battery module compartments are attached to hinges so that the battery module compartments rotate upwards and downwards via the hinges for battery module insertion), and so on.

Figure 2:
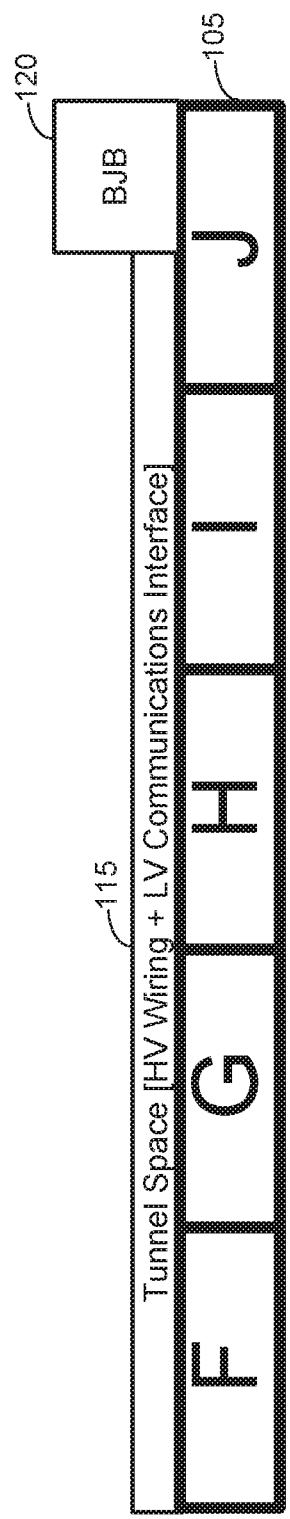
FIG. 2 illustrates a side-perspective of the cross-section of the electric vehicle described above with respect to FIG. 1.

FIG. 2 illustrates a side-perspective of the cross-section of the electric vehicle 100 described above with respect to FIG. 1. In FIG. 2, the side-perspective is from the left side of the electric vehicle 100, such that battery modules F . . . J are depicted. The tunnel space 115 is shown as extending from battery module F to battery module J along the middle bar 110 (not shown) of the battery housing 105. HV wiring may be run along the tunnel space 115 between the respective battery modules as noted above, and the HV wiring may be connected to the BJB 120. As shown in FIG. 2, the BJB housing of the BJB 120 is stacked or mounted on top of the battery housing. Also, as noted above, the BJB housing of the BJB 120 may be physically located at least in part under a rear passenger seat inside a passenger cabin of the electric vehicle 100 (and thereby above the floor of the electric vehicle 100), whereas the battery housing 105 may be configured as part of the structural floor of the electric vehicle 100.

Figure 3:
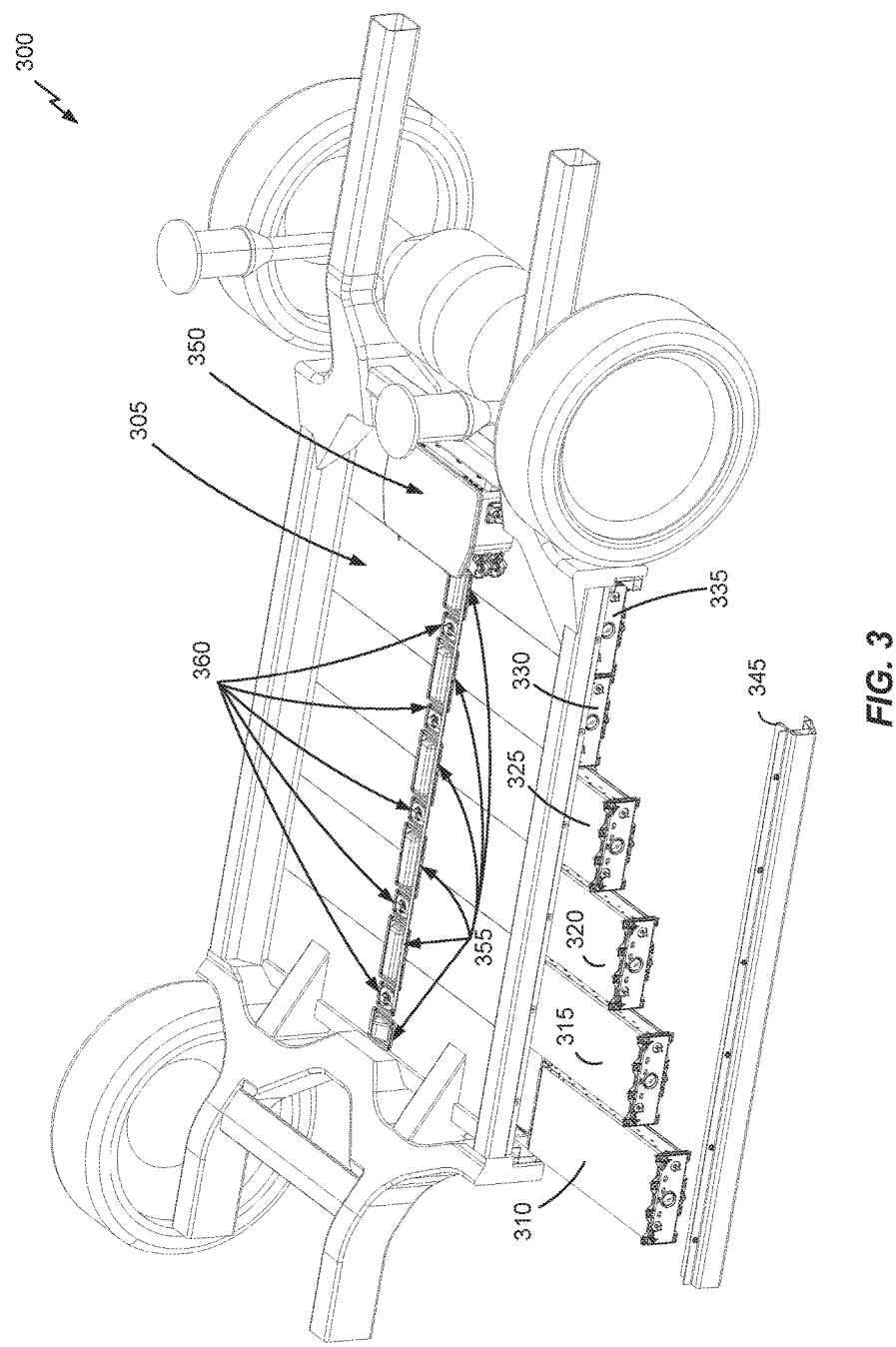
FIGS. 3-4 illustrate examples of battery junction box (BJB) placement that are specific to a lateral-inserted battery module mounting area configuration for a battery housing of an electric vehicle in accordance with an embodiment of the disclosure.
Figure 4:
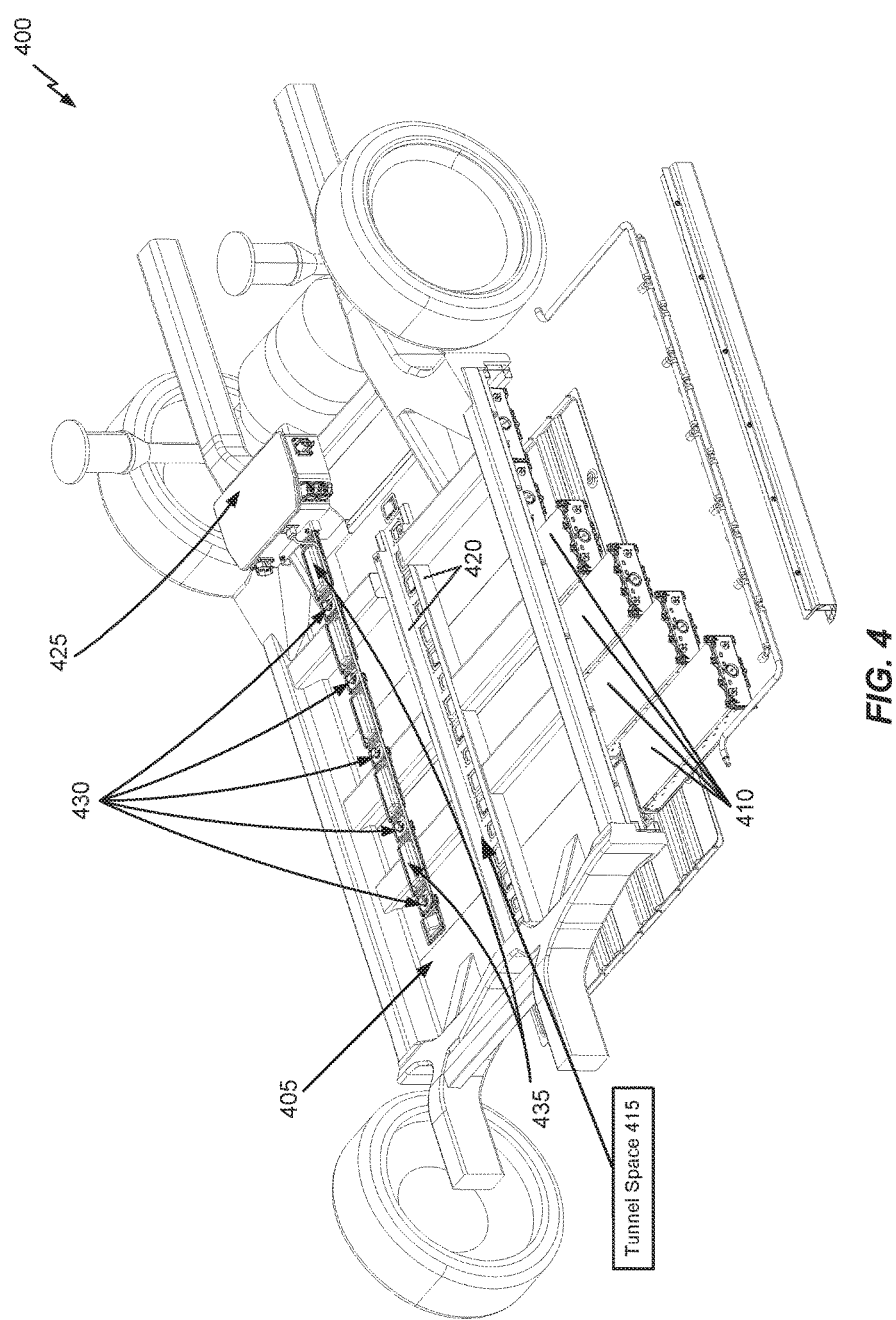

FIGS. 3-4 illustrate examples of BJB placement that are specific to a lateral-inserted battery module mounting area configuration for a battery housing of an electric vehicle in accordance with an embodiment of the disclosure.

Referring to FIG. 3, an electric vehicle 300 includes a battery module mounting area 305 (or battery housing) that includes, on a left side of the electric vehicle 300, battery module compartments configured to receive battery modules 310-335 via left-side lateral insertion. In FIG. 3, battery modules 310-325 are shown at different degrees of lateral insertion, while battery modules 330-335 are shown in a fully-inserted state. While not shown explicitly in FIG. 3, the battery module mounting area 305 may further include, on a right side of the electric vehicle 300, battery module compartments configured to receive other battery modules via right-side lateral (or side) insertion. More specifically, the insertion-sides of the battery modules 310-335 correspond to the left exterior-facing lateral side of each respective battery module compartment on the left side (longitudinally) of the electric vehicle 300, and the insertion-sides of the battery modules of each respective battery module compartment on the right side (longitudinally) correspond to the right exterior-facing lateral side of the electric vehicle 300. Rocker panel 345 may be attached to the electric vehicle 300.

Referring to FIG. 3, a BJB housing of a BJB 350 is mounted on top of the battery module mounting area 305 (or battery housing), and is electrically connected to the battery modules 310-335 (and also the right-side battery modules, which are not shown explicitly in FIG. 3) via HV busbars 355. Further, a BMC (not shown) coupled to the BJB 350 is communicatively coupled to each battery module via LV module-to-tunnel interfaces 360 arranged inside the tunnel space. In the embodiment of FIG. 3, the LV module-to-tunnel interfaces 360 are implemented as wired LV interfaces (or wired transceivers), which are connected to LV busbars. While not shown expressly in FIG. 3, the HV busbars 355 and LV module-to-tunnel interfaces 360 may each be deployed in a protected tunnel space, such as tunnel space 115 described above with respect to FIGS. 1-2. Referring to FIG. 3, an electric motor 365 is shown as positioned behind the BJB housing of the BJB 350.

Referring to FIG. 4, another electric vehicle 400 is depicted with a battery module mounting area 405 (or battery housing). The battery module mounting area 405 is configured similarly to the battery module mounting area 305 in FIG. 3. Various battery modules 410 are shown at various degrees of insertion into the battery module mounting area 405. A tunnel space 415 is defined above the battery module mounting area 405 by set of center-mounted bars 420. Further shown in FIG. 4 is a BJB housing of a BJB 425 which is configured to be mounted on top of the battery module mounting area 405 and is connected to wired LV module-to-tunnel interfaces 430 (coupled to respective LV busbars) and HV busbars 435. While not shown expressly in FIG. 4, the wired LV module-to-tunnel interfaces 430 and HV busbars 435 may be installed inside of the tunnel space 415, which may then be sealed.

Figure 5:
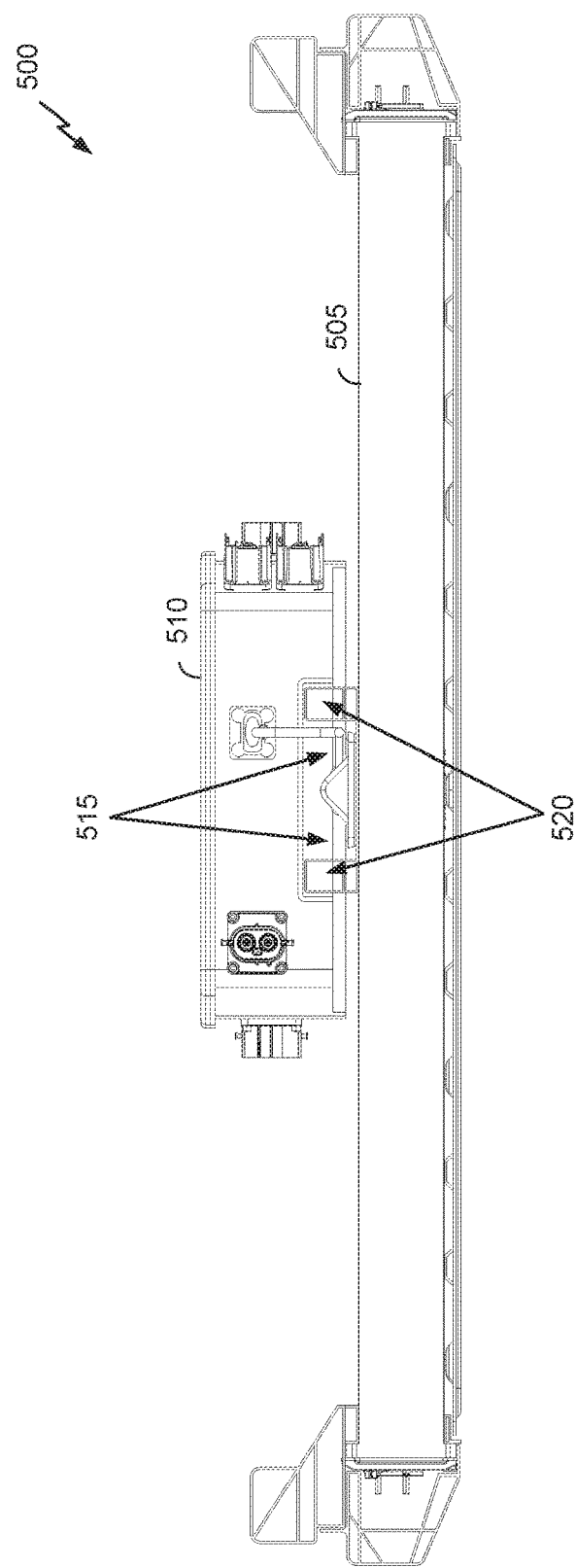
FIG. 5 illustrates a front-perspective a battery housing arrangement that shows a different perspective of the BJB placement in FIGS. 3-4 in accordance with an embodiment of the disclosure.

FIG. 5 illustrates a front-perspective a battery housing arrangement 500 that shows a different perspective of the BJB placement in FIGS. 3-4 in accordance with an embodiment of the disclosure. In FIG. 5, the front-perspective shows how a battery module mounting area 505 is viewed from a front of an associated electric vehicle, where a BJB housing of a BJB 510 is positioned at the back of the electric vehicle. Also shown is a tunnel space 515 is defined by center bars 510, in which HV busbars and LV module-to-tunnel interfaces between respective battery modules and the BJB 510 are arranged.

Figure 6:
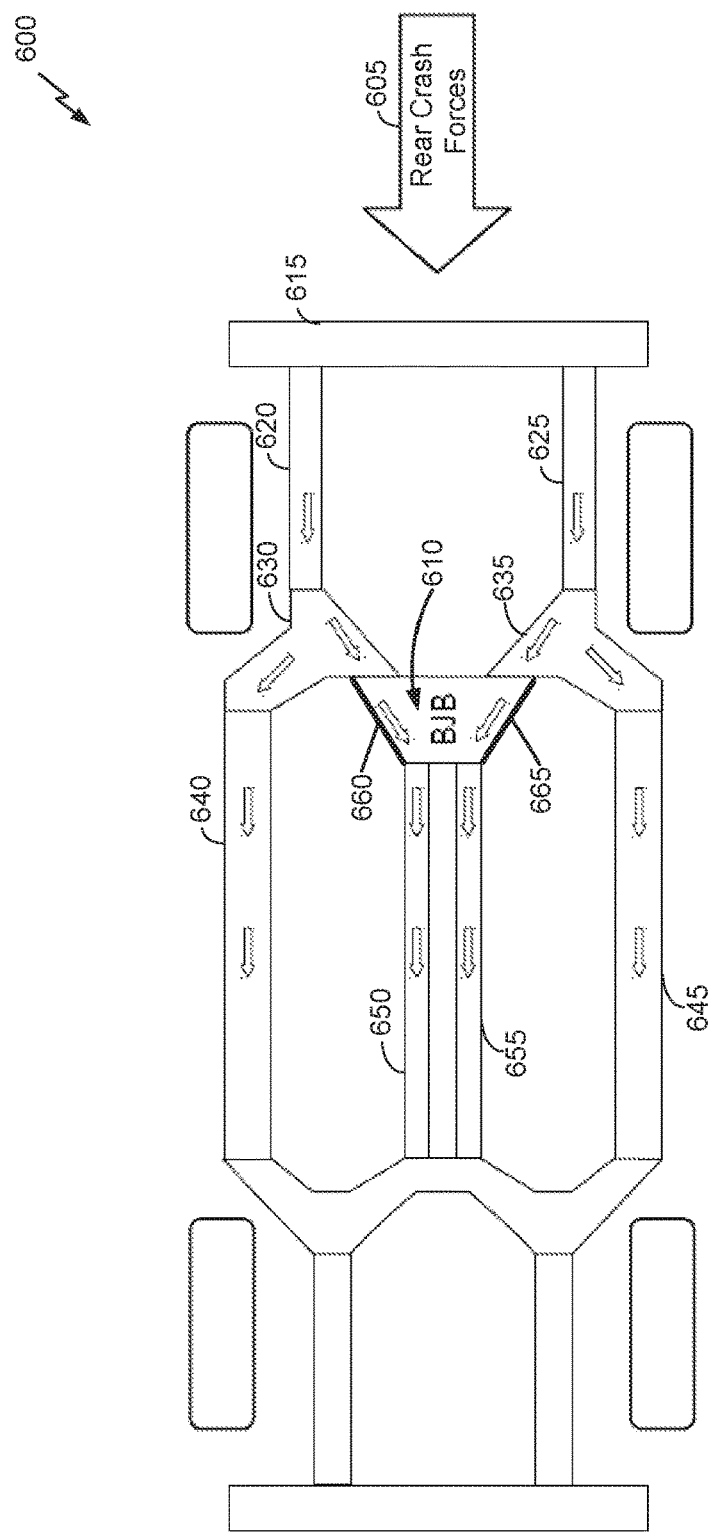
FIG. 6 illustrates a top-perspective of an electric vehicle that depicts a distribution of rear crash forces in accordance with an embodiment of the disclosure.

FIG. 6 illustrates a top-perspective of an electric vehicle 600 that depicts a distribution of rear crash forces 605 in accordance with an embodiment of the disclosure. In the embodiment of FIG. 6, a BJB housing of a BJB 610 is configured not only as a housing for an electrical component, but also as a structural component that interacts with structural support bars and/or chassis bars of the electric vehicle 600 to distribute the rear crash forces 605.

Referring to FIG. 6, the rear crash forces 610 (e.g., which may be caused by another vehicle crashing into the rear of the electric vehicle 600) initially impact a rear chassis bar 615, and are then moved to chassis bars 620 and 625 and then to chassis bars 630 and 635. The chassis bars 630 and 635 interface with lateral structural support bars 640 and 645, which may be mounted on top of a battery housing integrated into a floor of the electric vehicle 600. Accordingly, some of the crash forces passed to the chassis bars 630 and 635 are transferred to the lateral structural support bars 640 and 645, as well as a rocker panel (e.g., such as rocker panel 345), an underride guard (e.g., on a lower side of the battery housing), a middle bar (e.g., such as middle bar 110), and so on. Hence, it is understood that the BJB housing of the BJB 610 may be configured as one additional crash force transference component in embodiments of the disclosure, but not necessarily the exclusive crash force transference component.

In the embodiment of FIG. 6, the BJB housing of the BJB 610 itself is integrated as a structural component that interfaces with the chassis bars 630 and 635, such that crash bars are also transferred to the BJB housing of the BJB 610. The BJB housing of the BJB 610 in turn interfaces with a set of center structural support bars 650 and 655 which run longitudinally across the battery housing. Optionally, BJB structural support bars 660 and 665 may be added between the chassis bars 630 and 635 and the set of center structural support bars 650 and 655. The BJB housing of the BJB 610, either alone or in conjunction with the optional BJB structural support bars 660 and 665, functions to direct at least some of the crash forces from the chassis bars 630 and 635 to the set of center structural support bars 650 and 655. In an example, the BJB housing of the BJB 610 may be changed in shape relative to the BJBs housings described above with respect to FIGS. 1-5. For example, the BJB housing of the BJB 610 may adopt a "V" shape (e.g., wider towards the rear of the electric vehicle 600 and narrower at the interface to the set of center structural support bars 650 and 655) to help guide the crash forces towards.

Referring to FIG. 6, the set of center structural support bars 650 and 655 may correspond to structural support bars which define a tunnel space above the battery housing, as described above with respect to FIGS. 1-5. In a further example, the set of center structural support bars 650 and 655 may also include a middle bar integrated into the battery housing (or battery module mounting area) itself. Accordingly, the BJB housing of the BJB 610 may function to direct crash forces "above" the battery module mounting area along the structural support bars of the tunnel space, "through" the battery module mounting area along the middle bar, or a combination thereof.

FIGS. 7A-7E illustrate various perspectives of an electric vehicle in accordance with embodiments of the disclosure. In particular, the electric vehicle 700A is one example implementation of the electric vehicle 600 described above with respect to FIG. 6, whereby the BJB housing of the BJB 610 is integrated as a structural component. Further, FIGS. 7A-7E depict an example implementation whereby the BJB housing of the BJB 610 is stacked (or mounted) on top of a battery housing 710A (e.g., similar to battery housing 105).

Figure 7A:
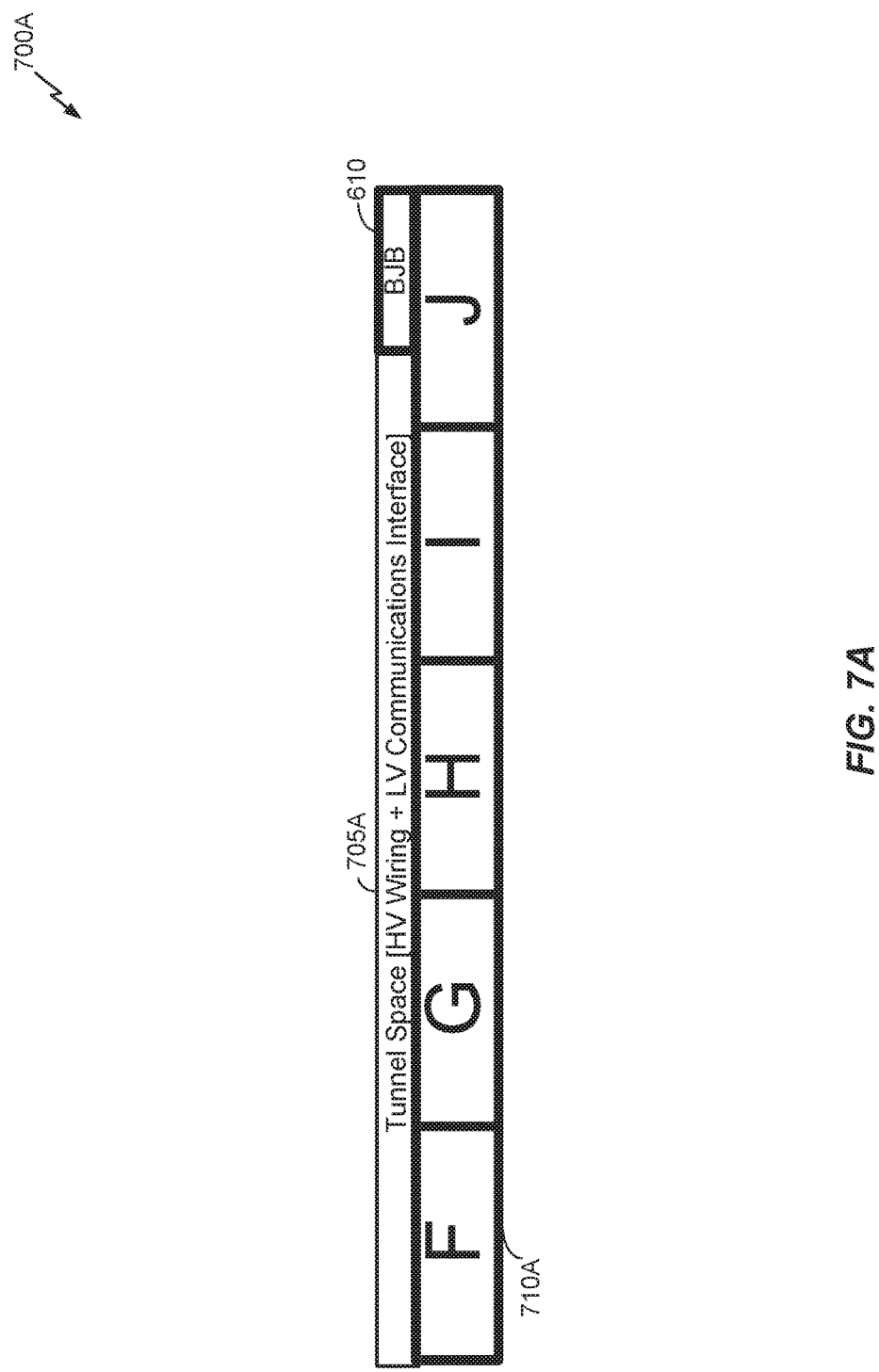

In FIG. 7A, a side-perspective of the electric vehicle 700A is shown, such that battery modules F . . . J are depicted. A tunnel space 705A is shown as extending from battery module F to battery module J on top of a middle bar (such as middle bar 110, not shown) of the battery housing 710A. HV wiring may be run along the tunnel space 705A between the respective battery modules as noted above, and the HV wiring may be connected to the BJB 610. Instead of protruding into the passenger cabin as is the case with respect to the BJB housing of the BJB 120 shown in FIG. 2, the BJB housing of the BJB 610 in FIG. 7A may be integrated into the floor of the electric vehicle 700A along with the rest of the battery housing 710A.

Figure 7B:
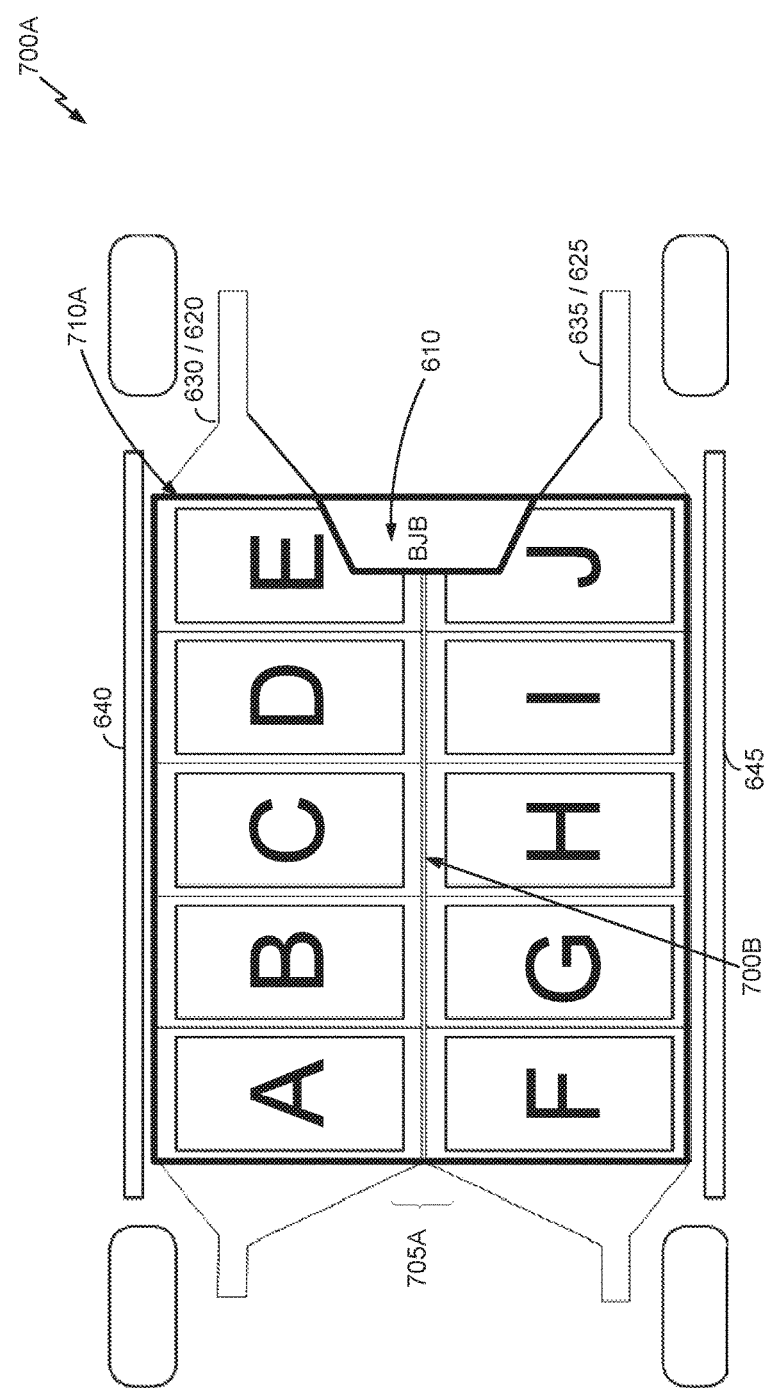

FIG. 7B illustrates a top-perspective of a cross-section of the electric vehicle 700A including the battery housing 710A in accordance with an embodiment of the disclosure. The tunnel space 705A is defined over a middle bar 700B (e.g., similar to the middle bar 110). Except for the changes noted above, the battery housing 605 may be configured similarly to the battery housing 105 described above with respect to FIG. 1.

FIG. 7C illustrates a zoomed-in top-perspective 700C of the interface between the BJB housing of the BJB 610 and the battery housing 710A in accordance with an embodiment of the disclosure. Various features described above with respect to FIGS. 7A-7B are illustrated in more detail in FIG. 7C, such as HV wiring 705C. In FIG. 7C, the BJB housing of the BJB 610 may be configured with a "V" shape in order to direct crash forces from one or more chassis bars (not shown) of the electric vehicle 700A to the set of center structural support bars 650 and 655. Further, the fixation area of the BJB housing of the BJB 610 to the one or more chassis bars (not shown) at the rear of the electric vehicle 700A is shown at 710C. This fixation area may be expanded from a fixation area associated with the BJB housing of the BJB 120 of FIG. 1 in an example to facilitate the crash force redirection functionality noted above. While not shown expressly in FIG. 7C, optional BJB structural support bars may be added between the one or more chassis bars (not shown) of the electric vehicle 700A and the set of center structural support bars 650 and 655 to facilitate direction of crash forces towards the set of center structural support bars 650 and 655, as described above. Referring to FIGS. 7A-7E, the BJB housing of the BJB 610 may optionally include the BJB structural support bars 660 and 665 (e.g., made from sheet metal, forging, die-casting, or a combination thereof).

Figure 7E:
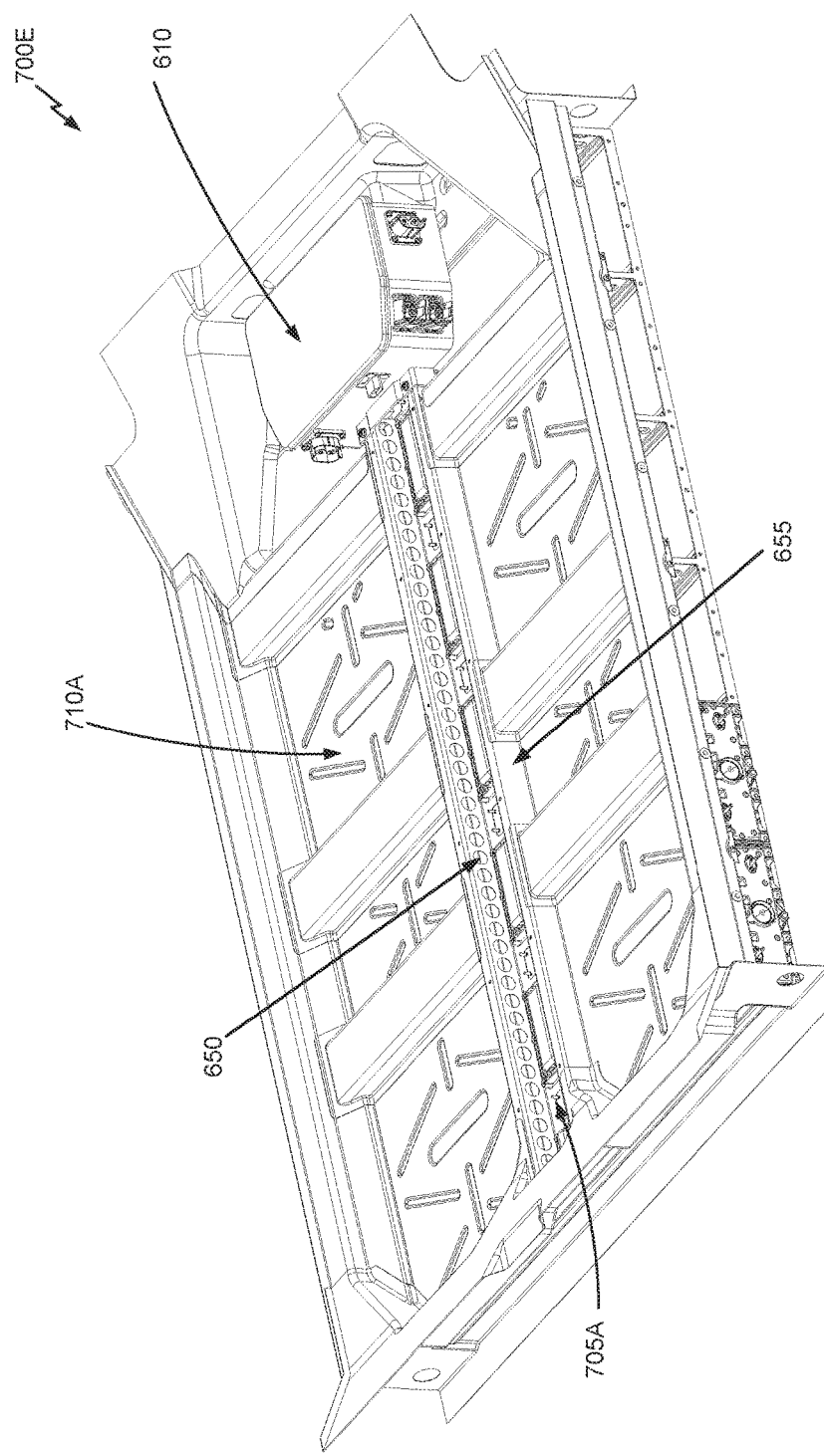

FIG. 7D-7E illustrates alternative perspectives 700D-700E of the interface between the BJB housing of the BJB 610 and the battery housing 710A in accordance with an embodiment of the disclosure. Referring to FIG. 7D, the BJB housing of the BJB 610 is shown as floating above the battery housing 700A so that the installation area for the BJB housing of the BJB 610 can be perceived. As shown in FIG. 7D, the BJB housing of the BJB 610 is configured to be sandwiched into a gap between the set of center structural support bars 650 and 655 and a fixation area 710C (e.g., which may be secured to the BJB housing of the BJB 610 via bolts). The BJB housing of the BJB 610 is shown in an installed position between the set of center structural support bars 650 and 655 and the fixation area 710C in FIG. 7E. The fixation area 710A may be directly or indirectly coupled to one or more chassis bars (not shown) for transferring crash forces to the BJB housing of the BJB 610, and then to the set of center structural support bars 650 and 655, and so on.

Figure 8A:
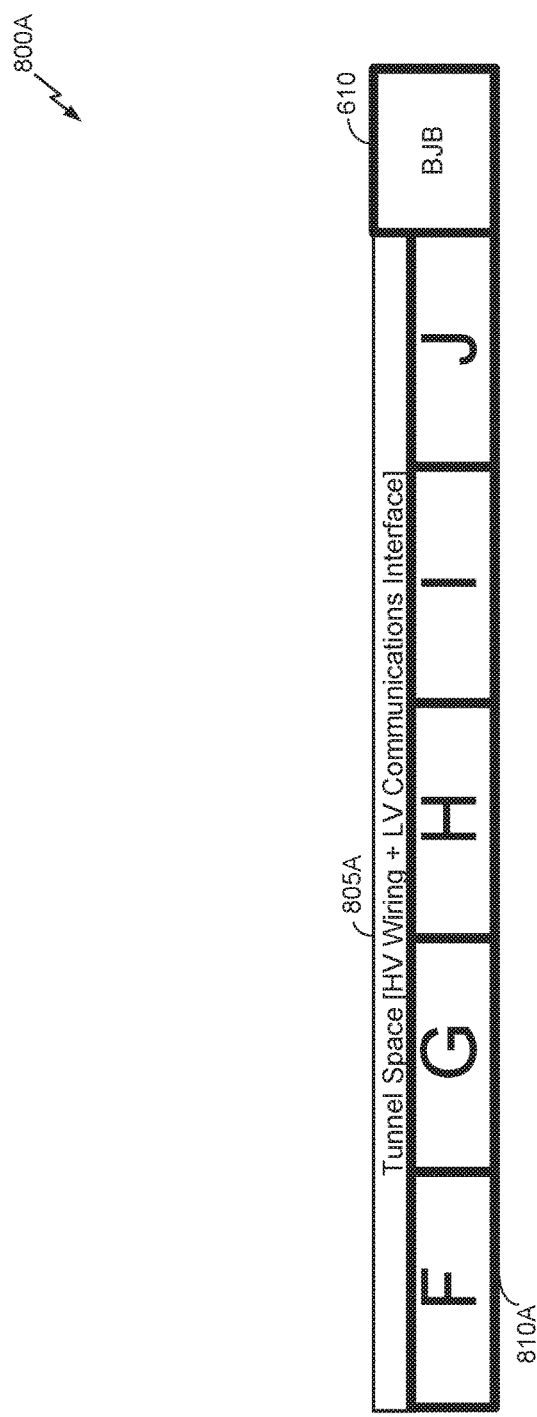
FIGS. 8A-8B illustrate various perspectives of an electric vehicle of FIG. 6 in accordance with other embodiments of the disclosure.
Figure 8B:
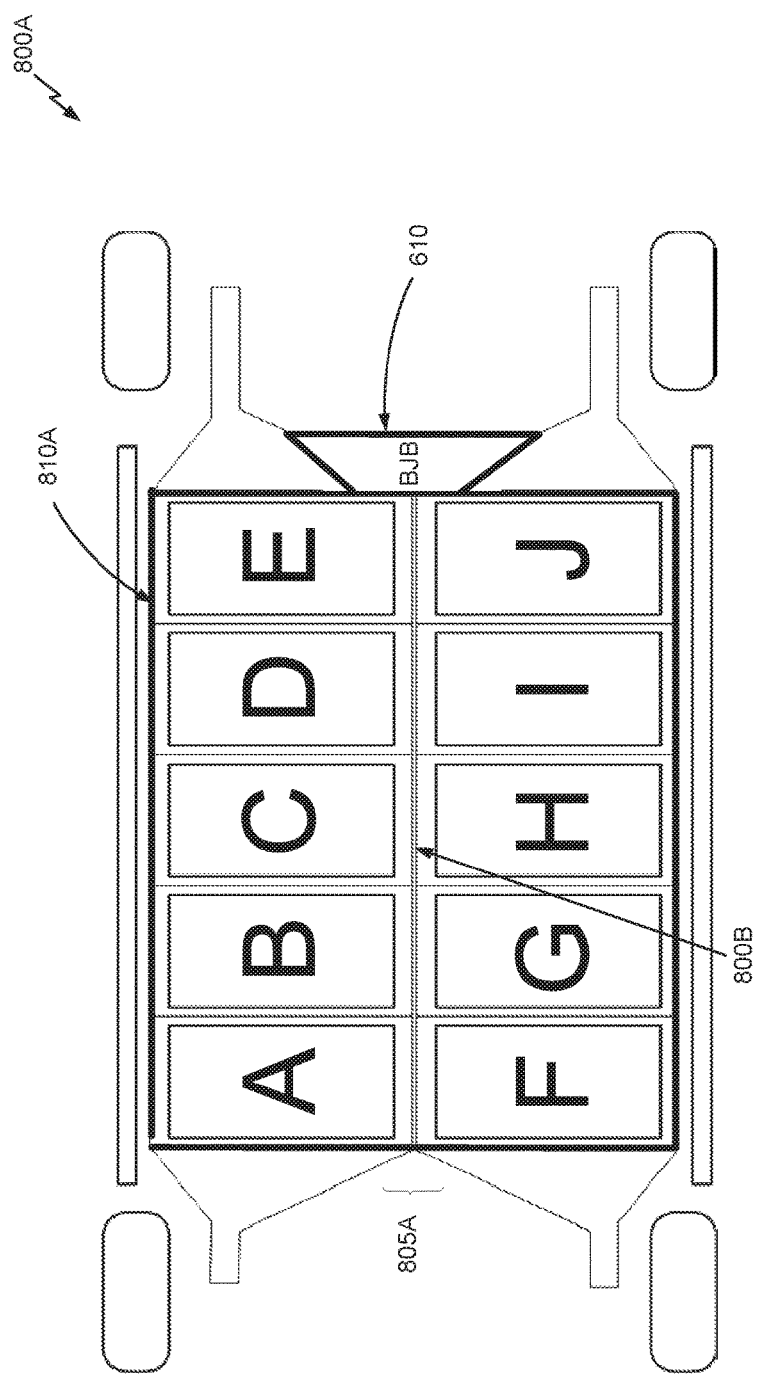

While FIGS. 7A-7E illustrate an example implementation whereby the BJB housing of the BJB 610 is stacked (or mounted) on top of the battery housing 710A, alternative embodiments are directed to an arrangement whereby the BJB housing is adjacent to the battery housing, as discussed below with respect to FIGS. 8A-8B. FIGS. 8A-8B illustrate various perspectives of an electric vehicle 800A of FIG. 6 in accordance with embodiments of the disclosure. In particular, the electric vehicle 800A is another example implementation of the electric vehicle 600 described above with respect to FIG. 6, whereby the BJB housing of the BJB 610 is integrated as a structural component. Further, FIGS. 8A-8B depict an example implementation whereby the BJB housing of the BJB 610 is adjacent to a battery housing 810A, instead of being stacked (or mounted) on top of the battery housing as in FIGS. 7A-7E.

In FIG. 8A, a side-perspective of the electric vehicle 800A is shown, such that battery modules F . . . J are depicted. A tunnel space 805A is shown as extending from battery module F to battery module J on top of a middle bar (such as middle bar 110, not shown) of the battery housing 810A. HV wiring may be run along the tunnel space 805A between the respective battery modules as noted above, and the HV wiring may be connected to the BJB 610. Instead of protruding into the passenger cabin as is the case with respect to the BJB housing of the BJB 120 shown in FIG. 2, the BJB housing of the BJB 610 in FIG. 8A may be integrated into the floor of the electric vehicle 800A along with the rest of the battery housing 810A.

FIG. 8B illustrates a top-perspective of a cross-section of the electric vehicle 800A including the battery housing 810A in accordance with an embodiment of the disclosure. The tunnel space 805A is defined over a middle bar 800B (e.g., similar to the middle bar 110). Except for the changes noted above, the battery housing 810A may be configured similarly to the battery housing 105 described above with respect to FIG. 1. Referring to FIGS. 8A-8B, the BJB housing of the BJB 610 may optionally include the BJB structural support bars 660 and 665 (e.g., made from sheet metal, forging, die-casting, or a combination thereof).

Referring to FIGS. 8A-8B, it will be appreciated that part of the BJB housing of the BJB 610 is vertically aligned (i.e., at the same vertical level) as the battery housing 810A. In this case, the BJB housing of the BJB 610 may be configured to spread crash forces not only to the tunnel space 805A, but also to the middle bar 800B inside the battery housing 810A. The middle bar 800B can thereby be considered another center structural support bar that runs longitudinally across the battery housing 810A (or battery module mounting area) that is separate from the center structural support bars 660 and 665 that define the tunnel space 805A. Accordingly, the BJB housing of the BJB 610 may be configured to distribute crash forces to the center structural support bars 660 and 665 above the battery housing 810A, to the middle bar 800B inside the battery housing 810A, or any combination thereof.

In electric vehicles, the electric motors for the drive are mounted in the front or rear of the vehicle, and are configured to drive the front or rear wheels directly or transversely. However, in the event of an accident, the electric motors can be pushed in the direction of the passengers (e.g., in frontal or backward crashes). In extreme cases, the passenger compartment and/or the battery housing may be pushed in or even destroyed. Damaged batteries may start to burn and lead to a fire, which represents a severe safety hazard.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. A battery housing arrangement integrated into a vehicle floor of an electric vehicle, comprising:
   a battery housing configured to house a plurality of battery modules;
   at least one center structural support bar that extends longitudinally across the battery housing;
   a battery junction box (BJB) housing including a BJB configured to be electrically coupled to each of the plurality of battery modules upon installation of the plurality of battery modules into the battery housing,
   wherein the BJB housing is positioned between the at least one center structural support bar and one or more vehicle chassis bars,
   wherein the BJB housing is configured to protect the plurality of battery modules in the battery housing from crash forces by directing crash forces from the one or more vehicle chassis bars to the at least one center structural support bar, and
   wherein the battery housing is permanently or irremovably integrated into a chassis of the electric vehicle.

2. The battery housing arrangement of claim 1, further comprising:
   a tunnel space that extends longitudinally along a center of the battery housing,
   wherein high-voltage (HV) wiring and a low voltage (LV) communications interface is run along the tunnel space to electrically couple the BJB to each of the plurality of battery modules.

3. The battery housing arrangement of claim 2,
   wherein the at least one center structural support bar includes two center structural support bars that are configured as sidewalls of the tunnel space, and
   wherein the tunnel space is enclosed by a sheet metal top that covers the two center structural support bars.

4. The battery housing arrangement of claim 3, wherein the sheet metal top is configured to add structural support to the battery housing and to provide electromagnetic shielding.

5. The battery housing arrangement of claim 2, wherein the tunnel space is defined above the battery housing by the at least one center structural support bar.

6. The battery housing arrangement of claim 2, wherein the LV communications interface includes LV wiring or a light tube for optical communications.

7. The battery housing arrangement of claim 1, wherein the at least one center structural support bar includes:

a middle bar integrated into the battery housing between longitudinally stacked battery module compartments, a set of structural support bars mounted on top of the battery housing, or a combination thereof.

8. The battery housing arrangement of claim 1, wherein the BJB housing is configured to direct the crash forces from the one or more vehicle chassis bars to the at least one center structural support bar in conjunction with one or more BJB structural support bars.

9. The battery housing arrangement of claim 1, wherein the crash forces directed by the BJB housing from the one or more vehicle chassis bars to the at least one center structural support bar include rear crash forces caused by a rear impact to the electric vehicle.

10. The battery housing arrangement of claim 1, wherein the battery housing and the BJB are vertically aligned with each other.

11. A battery housing arrangement integrated into a vehicle floor of an electric vehicle, comprising:

a battery housing configured to house a plurality of battery modules;

at least one center structural support bar that extends longitudinally across the battery housing;

a battery junction box (BJB) housing including a BJB configured to be electrically coupled to each of the plurality of battery modules upon installation of the plurality of battery modules into the battery housing, wherein the BJB housing is positioned between the at least one center structural support bar and one or more vehicle chassis bars, wherein the BJB housing is configured to protect the plurality of battery modules in the battery housing from crash forces by directing crash forces from the one or more vehicle chassis bars to the at least one center structural support bar, and wherein the battery housing includes:

a first set of battery module compartments arranged along a first longitudinal side of a battery module mounting area; and a second set of battery module compartments arranged along a second longitudinal side of the battery module mounting area, wherein each battery module compartment in the first and second sets of battery module compartments includes an insertion-side through which a battery module is configured to be inserted into the battery module compartment and/or removed from the battery module compartment, and wherein the insertion-side of each battery module compartment in the first and second sets of battery module compartments is configured to be closed via an insertion-side cover to form a battery housing with a closed compartment profile that is characterized by each battery module compartment being sealed from at least one other battery module compartment in the battery housing.

12. The battery housing arrangement of claim 11, further comprising:

a middle bar arranged longitudinally along or proximate to a lateral center of the battery module mounting area, wherein the middle bar divides the first set of battery module compartments from the second set of battery module compartments and is configured to structurally reinforce the battery module mounting area.

13. The battery housing arrangement of claim 12, wherein the middle bar is a single bar that extends across the battery module mounting area, or wherein the middle bar is an aggregation of independently constructed interior firewalls, each of the independently constructed interior firewalls being positioned between a pair of laterally adjacent battery module compartments from the first and second sets of battery module compartments.

14. A battery housing arrangement integrated into a vehicle floor of an electric vehicle, comprising:

a battery housing configured to house a plurality of battery modules;

at least one center structural support bar that extends longitudinally across the battery housing;

a battery junction box (BJB) housing including a BJB configured to be electrically coupled to each of the plurality of battery modules upon installation of the plurality of battery modules into the battery housing, wherein the BJB housing is positioned between the at least one center structural support bar and one or more vehicle chassis bars, wherein the BJB housing is configured to protect the plurality of battery modules in the battery housing from crash forces by directing crash forces from the one or more vehicle chassis bars to the at least one center structural support bar, and wherein the BJB housing is mounted on top of the battery housing.

* * * * *